United States Patent
Mehler et al.

(10) Patent No.: US 7,629,070 B2
(45) Date of Patent: Dec. 8, 2009

(54) BIPOLAR PLATE FOR PEM FUEL CELLS

(75) Inventors: Christof Mehler, Dossenheim (DE);
Martin Weber, Maikammer (DE);
Michael Senge, Weisenheim (DE);
Thomas Keβler, Schifferstadt (DE);
Ingolf Hennig, Neuluβheim (DE)

(73) Assignee: BASF Future Business GmbH, Ludwigshafen (DE)

( * ) Notice: Subject to any disclaimer, the term of this patent is extended or adjusted under 35 U.S.C. 154(b) by 458 days.

(21) Appl. No.: 10/664,862

(22) Filed: Sep. 22, 2003

(65) Prior Publication Data

US 2004/0058214 A1 Mar. 25, 2004

(30) Foreign Application Priority Data

Sep. 19, 2002 (DE) ................ 102 43 592

(51) Int. Cl.
*H01M 8/02* (2006.01)
(52) U.S. Cl. .......................... 429/39; 429/34
(58) Field of Classification Search .......... None
See application file for complete search history.

(56) References Cited

U.S. PATENT DOCUMENTS

| | | | |
|---|---|---|---|
| 5,098,610 A | 3/1992 | Okamura et al. | |
| 5,776,624 A | 7/1998 | Neutzler | |
| 5,958,303 A | 9/1999 | Narkis et al. | |
| 6,071,635 A | 6/2000 | Carlstrom, Jr. | |
| 6,080,502 A | 6/2000 | Noelscher et al. | |
| 6,300,001 B1 | 10/2001 | Hornung et al. | |
| 6,331,586 B1 * | 12/2001 | Thielen et al. | 524/401 |

FOREIGN PATENT DOCUMENTS

| | | |
|---|---|---|
| CA | 2 419 209 | 2/2003 |
| DE | 196 02315 | 7/1997 |
| EP | 1011164 A2 * | 6/2000 |
| EP | 1 061 597 A2 | 12/2000 |
| GB | 2 326 017 | 12/1998 |
| JP | 2002-097375 * | 4/2002 |
| WO | 98/33224 | 7/1998 |
| WO | 98/53514 | 11/1998 |
| WO | 00/68299 | 11/2000 |
| WO | 01/89013 | 11/2001 |

OTHER PUBLICATIONS

Tchoudakov et al., Conductive Polymer Blends With Low Carbon Black Loading: Polypropylene/Polyamide, Polymer Engineering and Science, May 1996, vol. 36, No. 10, pp. 1336-1346.

* cited by examiner

*Primary Examiner*—Jonathan Crepeau
(74) *Attorney, Agent, or Firm*—Novak Druce + Quigg LLP

(57) ABSTRACT

The bipolar plate for PEM fuel cells made of a polymer blend which is filled with conductivity-enhancing carbon fillers and which includes at least two mutually nonmiscible blend polymers, is distinguished by the fact that the at least two blend polymers form a co-continuous structure and the carbon fillers are at a higher concentration in one of the blend polymers or in the phase between the blend polymers, or that a blend polymer in which the carbon fillers are at a higher concentration forms a continuously conductive matrix in which the at least one further blend polymer is intercalated.

4 Claims, No Drawings

BIPOLAR PLATE FOR PEM FUEL CELLS

The invention relates to bipolar plates for PEM fuel cells, their fabrication and use in PEM fuel cells (fuel cell stacks) and their use for supplying power in mobile and stationary facilities, and also to the relevant materials.

The means of propulsion in motor vehicles hitherto have predominantly been internal combustion engines requiring petroleum products as the fuel. As petroleum resources are limited and the combustion products can have an adverse effect on the environment, research in recent years has increasingly been directed at alternative propulsion schemes.

The utilization of electrochemical fuel cells for mobile and stationary energy supply means is becoming more and more interesting in this context.

At present, various types of fuel cells exist, whose principle of operation is generally based on the electrochemical recombination of hydrogen and oxygen to give water as the end product. They can be categorized according to the type of the conductive electrolyte used, the operating temperature level and the achievable output ranges. Particularly suitable for use in motor vehicles are polymer-electrolyte-membrane fuel cells (PEM fuel cells, sometimes abbreviated as PEFC). They are usually operated at a temperature in the range from 50 to 90° C. and at present, in a complete stack, supply electrical power in the range from 1 to 75 kW (cars) and up to 250 kW (utility vehicles, buses).

In a PEM fuel cell, the electrochemical reaction of hydrogen with oxygen to produce water is divided into the two substeps reduction and oxidation by the insertion of a proton-conducting membrane between the anode electrode and the cathode electrode. This entails a separation of charges which can be utilized as a voltage source. Such fuel cells are summarized, for example, in "Brennstoffzellen-Antrieb, innovative Antriebkonzepte, Komponenten und Rahmenbedingungen [Fuel Cell Propulsion, Innovative Propulsion Schemes, Components and Constraints]", paper at the specialist conference of IIR Deutschland GmbH, May 29 to 31, 2000, Stuttgart.

An individual PEM fuel cell is of symmetric design. Arranged successively on both sides of a polymer membrane are one catalyst layer and one gas distribution layer each, followed by a bipolar plate. Current collectors are used to tap off the electrical voltage, while end plates ensure that the reactant gases are metered in and the reaction products are removed.

In such an arrangement, the bipolar plate bonds two cells mechanically and electrically. As the voltage of an individual cell is in the range around 1 V, practical applications require numerous cells to be connected in series. Often, up to 150 cells, separated by bipolar plates, are stacked on top of one another, the stacking arrangement of the cells being such that the oxygen side of the one cell is joined to the hydrogen side of the next cell via the bipolar plate. Here, the bipolar plate satisfies a number of functions. It serves for electrical interconnection of the cells, for supplying and distributing reactants (reactant gases) and coolant, and for separating the gas compartments. In this context, a bipolar plate must satisfy the following characteristics:
 chemical resistance to humid oxidative and reductive conditions
 gas tightness
 high conductivity
 low contact resistances
 dimensional stability
 low costs in terms of material and fabrication
 no design restrictions
 high stability under mechanical loads
 corrosion resistance
 low weight.

At present, three different types of bipolar plates are in use. Firstly, metal bipolar plates are employed which are composed, for example, of lightgrade alloy steels or coated other materials such as aluminum or titanium.

Metallic materials are distinguished by high gas tightness, dimensional stability and high electrical conductivity.

Graphite bipolar plates can be given a suitable shape by compression-molding or milling. They are distinguished by chemical resistance and low contact resistances, but in addition to high weight have inadequate mechanical performance.

Composite materials are composed of special plastics which include conductive fillers, e.g. based on carbon.

WO 98/33224 describes bipolar plates made of ferrous alloys which include high proportions of chromium and nickel.

GB-A-2 326 017 discloses bipolar plates made of plastic material, which are rendered conductive by electroconductive fillers such as carbon powder. In addition, a superficial metal coating can be present which, via the edges of the bipolar plate, enables an electroconductive connection between two cells.

According to WO 98/53514, a polymer resin is treated by incorporating an electroconductive powder and a hydrophilizer. Polymer compounds filled with silicon dioxide particles and graphite powder are used as bipolar plates. In particular, phenol resins are used for this purpose.

DE-A 196 02 315 relates to liquid-cooled fuel cells having distribution channels in the cell face. The cell face can be made of various materials, depending on its function The separators are made e.g. of graphite, titanium and/or metal alloys. For more even current collection, fabrics or meshes are used made of materials similar to those of the separators. Frame zones are made of plastic, for example.

U.S. Pat. No. 5,776,624 discloses a bipolar plate of welded-together metal layers. Located between the metal layers are coolant channels. The layers are conductively coupled via solder metal, preferably Ni alloys.

U.S. Pat. No. 6,071,635 relates to plates perfused by liquid or gas, e.g. bipolar plates composed of conductive and nonconductive materials. These materials form parts of terminal pads and/or channels on the surfaces of the plates. The conductive materials form electric conduits on the surface of the plate, and the nonconductive materials can form reinforcements and/or seals of the channels or parts of the periphery of the plate surface. They can be injection-molded, WO 02/15311 discloses bipolar plates for PEM fuel cells which are composed of a metal layer located in the interior and two nonconductive plastic layers bilaterally overlying the metal layer and enclosing it, which form the surfaces of the bipolar plates. The plastics used can be polyamides, polybutylene terephthalate, poly oxymethylene, polysulfone, polyether sulfone, polyphenylene oxide, polyether ketone, polypropylene, polyester, ethylene-propylene copolymers, unsaturated polyester resins or phenol-formaldehyde resins.

At the 17$^{th}$ Stuttgart Plastics Colloquium, R. Kaiser and H.-G. Fritz gave a report on high-conductivity polymer compounds for fuel cell applications. The polymers used were a thermotropic self-reinforcing polyarylate comprising hydroxybenzoic acid units and hydroxynaphthalic acid units and a polyphenylenesulfide. To improve the conductivity, the plastics were admixed with carbon black or graphite. The effect of the mean particle size of these additives on the percolation behavior of the compounds was studied.

WO 01/89013 relates to a bipolar plate for proton exchange membrane fuel cells. The bipolar plate is composed of a resin and a multiplicity of carbon nanotubes having a mean diameter of from 1 to 300 nm. The carbon fibers are present in the molding compound in an amount of from about 7 to 85 wt %, preferably from 10 to 50 wt %. Mentioned as suitable resins are polypropylene copolymers, HDPE, polyacrylonitrile, silicone elastomers, polyvinylidene fluoride, polychlorotrifluoroethylene and epoxy and polyester amides. Liquid-crystalline resins can also be used. The molding, may also include reinforcing means such as chopped glass fibers or carbon fibers.

WO 00/68299 relates to polyphenylene ether/polyamide blends which, to adjust their conductivity, can contain from 0.2 to 3 wt % of fillers in the form of a mixture of carbon black and carbon fibrils. Mentioned as an application are exterior components in the motor vehicle sector, which can be electro-dipped. A polymer phase is described as being present in dispersed form in a continuous phase.

As bipolar plates are critical functional elements of PEM fuel cell stacks, which make a considerable contribution to the costs and the weight of the stack, there is great demand for bipolar plates which meet the abovementioned requirement profile and avoid the drawbacks of the known bipolar plates. In particular, uncomplicated and cost-effective fabrication of bipolar plates is to be feasible.

The object is achieved according to the invention by a bipolar plate for PEM fuel cells made of a polymer blend which is filled with conductivity-enhancing carbon fillers and which includes at least two mutually nonmiscible blend polymers, wherein the at least two blend polymers form a co-continuous structure and the carbon fillers are at a higher concentration in one of the blend polymers or in the phase between the blend polymers, or wherein a blend polymer in which the carbon fillers are at a higher concentration forms a continuously conductive matrix in which the at least one further blend polymer is intercalated.

According to the invention it was found that advantageous bipolar plates for PEM fuel cells are obtained if their fabrication makes use of a polymer blend having at least two mutually nonmiscible blend polymers which form a co-continuous structure or contain a matrix of a conductive polymer. The expression "mutually nonmiscible" means that the blend polymers during the mixing operation form largely separate phases and do not dissolve in one another or do not mix with one another. A proportion of up to 10 wt %, preferably up to 5 wt %, of blend polymers dissolved in one another or mixed with one another in this context is compatible with the expression "mutually nonmiscible". Preferably, the blend polymers overall are mutually nonmiscible. The expression "co-continuous structure" relates to a structure in which both blend polymers form a continuous phase, rather than, for example, particles of one blend polymer being present in dispersed form in the other blend polymer as a continuous phase. The co-continuous structure can, for example, also be described as an interpenetrating network, where networks of the individual blend polymers are formed which are interweaved or penetrate one another. A co-continuous structure can easily be detected by morphology analyses. Such morphology analyses can be standard microscopy methods, e.g. reflective and fluorescent images of cross sections through a polymer blend. Domain sizes are in the range, for example, of up to a few micrometers, for example 0.5-50 µm. A conductive matrix is obtained if a blend polymer forms a continuous structure and has a higher concentration of the carbon fillers.

Preferably, the carbon fillers in the polymer blends used according to the invention are selected from conductive black, graphite, carbon fibers, carbon nanotubes or mixtures thereof. Carbon nanotubes preferably have a mean diameter in the range of from 1 to 300 nm. Carbon nanotubes can be purchased, for example, from Applied Sciences Inc. or Hyperion Catalysis International. Such carbon nanotubes are described, for example, in WO 01/89013, U.S. Pat. No. 5,651,922 and U.S. Pat. No. 5,643,502, and also in WO 01/36536 and WO 00/68299.

They can be single-wall or multiwall carbon nanotubes, with the nanotubes being present individually or as bundles, for example as bundles in a hexagonal arrangement. Preparation of the carbon nanotubes can be by catalytic chemical vapor deposition at ambient pressure or high pressure, or alternatively via a graphite spark technique in the presence or absence of a catalyst or via a laser vapor deposition technique in the presence of a catalyst. Such techniques are described, for example, in Carbon, Volume 32, p. 569 (1994), Nature, Volume 354, p. 56 (1991), and Science, Volume 273, p. 483 (1996).

In the case of multiwall carbon nanotubes, the diameter is preferably from 10 to 200 nm, the mean diameter of single-wall carbon nanotubes preferably being from 0.5 to 5 nm. The mean length of the carbon nanotubes can, for example, be in the range from 1 to 1000 µm. Conductive black can be obtained, for example, from Degussa. Various grades having differences in their structure, surface chemistry and wetting behavior can be used. The specific surface area of the finely disperse, partially microcrystalline carbons is preferably from 10 to 2000 $m^2/g$, for high-conductivity applications preferably from 800 to 1250 $m^2/g$, measured via nitrogen adsorption. The aggregation state (structure) of such finely dispersed solids can be described by their DBP (dibutyl phthalate) number. A high DBP value suggests a large pore volume and consequently high structuring (porosity). The DBP values of the carbon blacks employed according to the invention are preferably in the range from 50 to 1000 ml of DBP/(100 g of CB).

Graphite is preferably employed with a mean particle diameter in the range from 50 to 500 µm, the particle size distribution preferably covering a range of 3 orders of magnitude, for example from 10 to 1000 µm.

Carbon fibers are known to those skilled in the art and can be derived from various sources. Preferentially used are carbon fibers having a mean diameter in the range from 1 to 50 µm and a fiber length in the range from 10 µm to 50 mm, e.g. from 50 µm to 30 mm.

The polymer blends used according to the invention contain at least two mutually nonmiscible blend polymers. Preferably, from 2 to 4, particularly preferably 2 or 3, especially 2, blend polymers are present. Preferably, the blend polymers have different polarities and the carbon fillers are at a higher concentration in the more polar blend polymer.

The blend polymers can be selected, for example, from polyamides, polybutyleneterephthalate, polyoxymethylene, polysulfone, polyether sulfone, polyether, polyphenylene oxide, polyether ketone, polypropylene, polyester, ethylene-propylene copolymers etc. The blend polymers enriched with carbon fillers are preferably partially crystalline and thermoplastic. Those skilled in the art will select suitable combinations of blend polymers, so that the blend polymers are mutually nonmiscible and have different polarities. Preferably, a two-component system is used in which the two blend polymers satisfy different functions the less polar blend polymer serves to adjust the desired mechanical characteristics, while the more polar polymer, in which the carbon fillers are also at a higher concentration, is responsible for the necessary conductivity.

Particularly preferred according to the invention is the use of a polymer blend of polyamide and polyether sulfone or its copolymers, where the polyamide represents the more polar blend component which is responsible for establishing the conductivity. The polyether sulfone serves to adjust the desired and required mechanical properties. Where appropriate, it can comprise copolymer components. The polyamide used is preferably a polyamide 6.6, which is derived from adipic acid and hexamethylenediamine units. The viscosity (VN) is preferably from 130 to 170 ml/g, in particular about 150 ml/g, determined in accordance with ISO 307 (0.5% in concentrated $H_2SO_4$).

The polyether sulfone used is preferably a purely or mixedly aromatic polyether sulfone (PES), where in addition to the ether and sulfone bridges preferably nothing but phenylene groups are present, especially 1,4-phenylene groups or units derived from bisphenol A.

The polyarylene ether sulfone used can be one having repeating units of formula $I_1$, Ultrason® E 2010, commercially available from BASF Aktiengesellschaft. This product is characterized by a viscosity number of 54 ml/g, measured in 1% NMP solution at 25° C.

Another polyarylene ether sulfone used can be one having repeating units of formula $I_2$, Ultrason® S 2010, commercially available from BASF Aktiengesellschaft. This product is characterized by a viscosity number of 56 ml/g, measured in 1% NMP solution at 25° C. This polyarylene ether sulfone was used in the examples. Often it is also referred to as polysulfone.

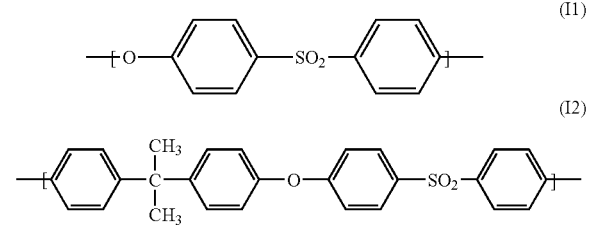

The properties chosen for the polymers in this context are such that the polyamide in combination with the carbon fillers provide adequate conductivity in the co-continuous structure. To this end, it is advantageous for the carbon fillers to be at a higher concentration in the polyamide phase. This means that preferably from 60 to 100%, particularly preferably from 70 to 100%, of the carbon fillers are present in the polyamide phase.

Based on the total filled polymer blend, preferably from 25 to 95 wt %, particularly preferably from 35 to 90 wt %, especially from 45 to 85 wt %, of blend polymers and from 5 to 75 wt %, particularly preferably from 10 to 65 wt %, especially from 15 to 55 wt %, of carbon fillers are present.

Preferred lower limits for the carbon fillers are at least 10% or at least 20%.

In the polymer blend of polyamide, preferably PA6.6, and polyether sulfone, the weight ratio of polyamide to polyether sulfone is preferably from 1:8 to 8:1, particularly preferably from 1:4 to 6:1, especially from 1:1.6 to 4:1.

The polymer blend contains as carbon fillers
preferably from 1 to 30 wt %, particularly preferably from 2 to 20 wt %, especially from 4 to 15 wt %, of conductive black,
preferably from 5 to 60 wt %, particularly preferably from 8 to 50 wt %, especially from 10 to 40 wt %, of carbon fibers, and
preferably from 0 to 25 wt %, particularly preferably from 0 to 15 wt %, especially from 0 to 10.5 wt %, of carbon nanotubes.

Here, the total amount of carbon fillers is from 6 to 70 wt %, all the values being based on the total weight of the filled polymer blend.

If carbon nanotubes are present, their amount is at least 1 wt %, preferably at least 2 wt %, especially at least 3 wt %. Defined as the upper limits are the abovementioned preferred ranges.

The bipolar plate according to the invention is generally of sheet-like design and consequently has two faces opposite one another. In the edge region, the bipolar plates are compressed with other components of the fuel cells to form stacks. Consequently, in these edge zones of the surface, the bipolar plates according to the invention preferably are provided with suitable means for gas-tight bonding of the bipolar plates to the other components of the cells or are designed to accommodate such means.

The invention also relates to a method of fabricating bipolar plates as described above by preparing and shaping the filled polymer blend. Such shaping can be effected via any suitable known technique, for example by injection molding or injection stamping.

The invention also relates to the filled polymer blend having a co-continuous structure as described.

In this context, the plastic structure in the surface zone includes the necessary gas-transport channels.

The bipolar plate made of plastic generally has a plate thickness of >1 mm, often >2 mm. Preferably, the plate thickness is from 2.1 mm to 5.0 nm, particularly preferably from 2.5 mm to 3.5 mm. The plate thicknesses of bipolar plates used hitherto are generally 5 mm Therefore, given the multiplicity of individual plates used for a fuel cell stack, it is possible, via the reduction in the plate thickness as achieved by means of the bipolar plates according to the invention and via the use of plastic instead of e.g. graphite, to achieve a considerable reduction in the total weight of a fuel cell and in the overall volume occupied thereby.

The bipolar plates according to the invention are generally employed in PEM fuel cells or in fuel cell stacks of a plurality of individual cells. Such fuel cell stacks are produced by repeatedly stacking bipolar plate, gas distribution layer, catalyst layer, polymer membrane, catalyst layer and gas distributor layer on top of one another, an individual cell being present between each set of two bipolar plates. In addition, terminal current collectors and end plates are attached. The elements, stacked on top of one another, of the fuel cell stacks are connected and sealed. For sealing purposes, elastomer seals can be applied in the edge zone of the bipolar plates according to the invention, or a seam geometry for subsequent welding, cementing or injection welding can be integrally molded directly from the plastic.

In the first case, sealing is effected by firmly pressing the plates together. In the second case, the plates can be welded or cemented to one another. Welding can be carried out by any suitable technique, for example ultrasonic welding, heated-tool welding, vibration welding or laser welding. The individual elements of the fuel cells can alternatively be bonded together and sealed by cementing or injection welding.

Alternatively, the fuel cell stack can be sealed and bonded together by the entire plate stack being spray-packaged, via an injection-molding technique using suitable polymer materials.

An integrally molded elastomer seal can be formed, for example, by two-component injection molding at the same time as the plastic layer.

The provision of a raised circumferential rim with an integrally molded welded-seam geometry, in particular, permits cost-effective, gas-tight bonding of the elements to form a fuel cell stack The fuel cell stacks according to the invention can be used, for example, for supplying power in mobile and stationary facilities. Apart from domestic supplies, possible options include, in particular, power supplies of vehicles such as land vehicles, watercraft and aircraft as well as autarkic systems such as satellites.

The fuel cell stacks according to the invention are preferably stable in a temperature range from −40 to +120° C., the operating temperature range in particular being in the range around 100° C., temperature control being achievable by suitable cooling media which communicate at least with part of the stack.

The bipolar plates according to the invention unite an advantageous combination of low weight, good electrical conductivity, gas tightness or sealability and gas-channel design.

The invention is explained in more detail by the following examples:

EXAMPLE 1

A polymer blend was prepared by mixing polyamide 6.6 (PA6.6) having a VN=150 ml/g, and containing 25 wt % of carbon black, with polyether sulfone (PES), Ultrason® S 2010. In addition, carbon fibers were introduced into the polymer blend. The filled polymer blend had the following composition: polyether sulfone: 30 wt %; polyamide 6.6: 22.5 wt %; conductive black (DBP value: 119 ml/100 g) (Printex® L from Degussa): 7.5 wt %; carbon fibers (Fortafil® 243): 40 wt %.

The polymer blend had a specific conductivity of 22 S/cm.

This blend and those described below were prepared on a twin-screw extruder (ZSK 40, screw design 24D).

A morphology analysis by confocal laser scan microscopy (CLSM) indicated a co-continuous structure of the blend polymers, the conductive carbon fillers being present very predominantly in the polyamide phase.

EXAMPLES 2 TO 4

As in Example 1, the following different filled polymer blends were prepared. The conductivity was determined according to ISO 3915 (4-point method). The results are summarized in the following table.

| Examples | Blends | Specific conductivity [S/cm] | |
|---|---|---|---|
| | | $\sigma \text{II} 4$ | $\sigma \perp 4$ |
| 2 | 10% PES, 40% PA6.6, 10% carbon black, 40% C fibers | 14 | 6 |
| 3 | 30% PES, 23.25% PA6.6, 6.75% carbon black, 40% C fibers | 21 | 4 |
| 4 | 50% PES, 32% PA6.6, 4% carbon black, 10% C fibers. 4% C nanotubes | 3 | 0.11 |
| 5 | 30% PES, 22.5% PA6,6, 7.5% carbon black, 40% C fibers, | 22 | 1.7 |

G II4: Conductivity in the plane of the plate
G I4: Conductivity perpendicular to the plane of the plate

The invention claimed is:

1. A bipolar plate for PEM fuel cells comprising a plastic structure having a surface zone including gas-transport channels, the plastic structure comprising a polymer blend which is filled with conductivity-enhancing carbon fillers and which includes at least two mutually nonmiscible blend polymers,
wherein the polymer blend includes at least one polyamide and at least one polyether ketone or polyether sulfone as blend polymers,
wherein the at least two blend polymers form a co-continuous structure and the carbon fillers are at a higher concentration in one of the blend polymers or in the phase between the blend polymers, or wherein a blend polymer in which the carbon fillers are at a higher concentration forms a continuously conductive matrix in which the at least one further blend polymer is intercalated,
wherein the polymer blend comprises from 45 to 85 wt % of blend polymers and from 15 to 65 wt % of carbon fillers, and
wherein the polymer blend contains as carbon fillers
from 1 to 30 wt % of conductive black,
from 5 to 60 wt % of carbon fibers, and
from 1 to 25 wt % of carbon nanotubes,
in each case based on the total weight of the polymer blend, and
the weight ratio, in the polymer blend, of polyamide to polyether ketone/polyether sulfone is from 1:1.6 to 4:1.

2. The bipolar plate as claimed in claim 1, wherein the carbon fillers are selected from conductive black, graphite, carbon fibers, carbon nanotubes and mixtures thereof.

3. A method of fabricating bipolar plates as claimed in claim 1 by preparing and shaping the polymer blend filled with conductivity-enhancing carbon fillers.

4. A PEM fuel cell comprising bipolar plates as claimed in claim 1.

* * * * *